(12) United States Patent
Duncan

(10) Patent No.: US 6,226,968 B1
(45) Date of Patent: May 8, 2001

(54) TOBACCO PLANT TRANSPORT APPARATUS

(76) Inventor: George A. Duncan, 3441 Belvoir Dr., Lexington, KY (US) 40502

( * ) Notice: Subject to any disclaimer, the term of this patent is extended or adjusted under 35 U.S.C. 154(b) by 0 days.

(21) Appl. No.: 09/413,008

(22) Filed: Oct. 6, 1999

(51) Int. Cl.[7] .................................................. A01D 45/16
(52) U.S. Cl. ............................................. 56/27.5; 414/501
(58) Field of Search ................................... 56/27.5, 11.9, 56/327.1; 414/501, 502, 26

(56) References Cited

U.S. PATENT DOCUMENTS

| | | | |
|---|---|---|---|
| 3,902,304 | * 9/1975 | Mitchell et al. | 56/27.5 |
| 3,902,607 | * 9/1975 | Middleton | 414/26 |
| 4,037,392 | * 7/1977 | Taylor et al. | 56/27.5 |
| 4,192,124 | * 3/1980 | Balthes | 56/27.5 |
| 4,444,001 | * 4/1984 | Thurnau et al. | 56/27.5 |
| 4,813,216 | * 3/1989 | Day et al. | 56/27.5 |
| 5,400,577 | * 3/1995 | Duncan et al. | 56/27.5 |

* cited by examiner

Primary Examiner—Robert E. Pezzuto
Assistant Examiner—Arpád Fáb Kovács
(74) Attorney, Agent, or Firm—Frank C. Leach, Jr.

(57) ABSTRACT

After a cutter of a tobacco harvester cuts each tobacco plant, the cut tobacco plant has its stalk penetrated by toothed elements on two chains on opposite sides of the cut tobacco plant to advance it to an elevated position. Just prior to being released by the toothed elements, the stalk of the cut tobacco plant has its butt end engage a ramp to retard its motion to tilt the cut tobacco plant. This results in the cut tobacco plant pivoting to fall by gravity as its leaves are engaged by wheels to advance the cut tobacco plant. The butt end of the stalk falls into an area of a continuously rotating disc so that the cut tobacco plant has a substantially horizontal orientation. The cut tobacco plant is then advanced by chains and cleats to a spearing mechanism where the cut tobacco plant is automatically loaded on a stick.

21 Claims, 8 Drawing Sheets

TOBACCO PLANT TRANSPORT APPARATUS

This invention relates to a tobacco harvester and, more particularly, to an improved transport arrangement for transporting cut tobacco plants to a position in a tobacco harvester in which each can be automatically loaded on a tobacco stick.

This invention is an improvement of the tobacco harvester of U. S. Pat. No. 5,400,577 to Duncan et al, which is incorporated by reference herein. The tobacco harvester of the aforesaid Duncan et al patent required two workers with one of the workers having to pick up each of the tobacco plants after it was cut or severed at its butt end and precisely position the cut tobacco plant for transport to a spear from which it was advanced automatically onto a tobacco stick.

U. S. Pat. No. 4,813,216 to Day, V, et al discloses a cut tobacco plant being transported to an elevated position in a substantially vertical orientation. The transport system makes two 90° changes of the cut tobacco plant to invert the cut tobacco plant so that its leaves hang downwardly. This requires a relatively high structure of about 12'. There also is a requirement for a special curing frame.

The tobacco harvester of the present invention utilizes a unique transport system in which the cut or severed tobacco plant is automatically transported without a worker being involved to a position in a tobacco harvester in which it can be automatically disposed on a tobacco stick in the manner shown and described in the aforesaid Duncan et al patent.

The tobacco harvester of the present invention disposes the tobacco plant after it is cut or severed with its stalk in a substantially vertical orientation. The cut tobacco plant is transported in its substantially vertical orientation along an inclined path to an elevated position.

Just prior to reaching the elevated position, advancement of the butt end of the stalk is retarded so that release of the tobacco plant at the elevated position causes it to begin to pivot to fall by gravity onto a conveyor system. The conveyor system transports the tobacco plant in a substantially horizontal orientation to a spearing mechanism of the aforesaid Duncan et al patent. Thus, a relatively compact structure is provided in which there is only a 90° change in direction of motion of the tobacco plant.

The present invention includes an arrangement for controlling the motion of the butt end of the stalk of the cut tobacco plant after it starts to fall due to gravity. This insures that the cut tobacco plant is in its substantially horizontal orientation when it falls onto the conveyor system.

An object of this invention is to provide an improved tobacco harvester.

Another object of this invention is to increase the throughput of a tobacco harvester.

A further object of this invention is to provide a tobacco harvester having a mechanical arrangement for transporting a cut tobacco plant from its cutting position until the tobacco plant is placed on a spear and a stick.

Other objects of this invention will be readily perceived from the following description, claims, and drawings.

The attached drawings illustrate a preferred embodiment of the invention, in which.

Figure 1:
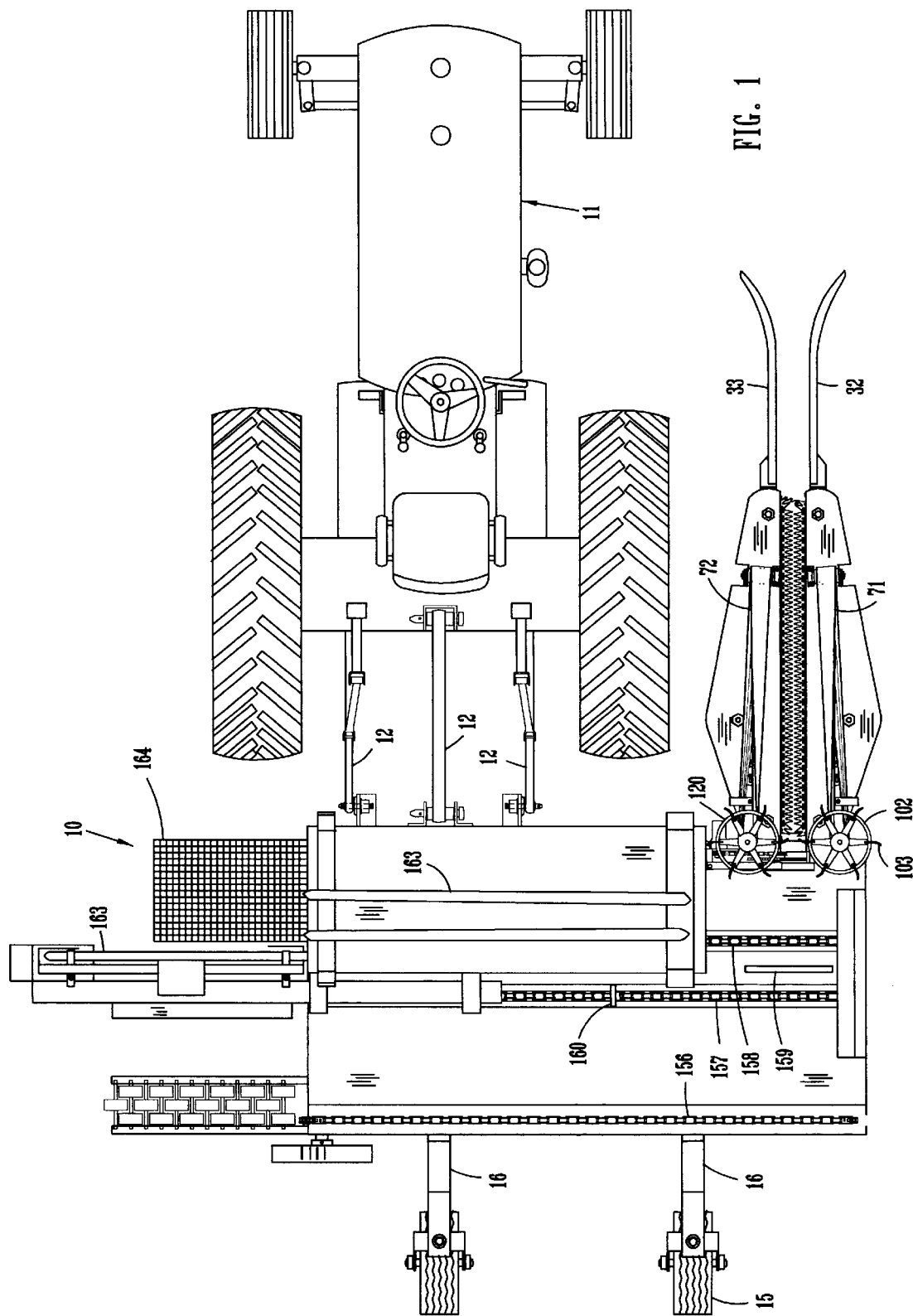
FIG. 1 is a top plan view of a tobacco harvester of the present invention connected to a tractor.

Referring to the drawings and particularly FIG. 1, there is shown a tobacco harvester 10 of the present invention connected to a tractor 11 by tractor lifting links 12. The tractor lifting links 12 are connected to a three point hitch frame 14 (see FIG. 3) of the tobacco harvester 10. Thus, the tractor 11 (see FIG. 1) provides the motive power for the tobacco harvester 10.

A pair of rear wheels 15 is connected to the frame 14 (see FIG. 3) through two square hollow tubes 16. Two square hollow tubes 17 and 18 (see FIG. 6) are connected to the frame 14 (see FIG. 3).

The hollow tube 18 (see FIG. 6) is secured to the upper end of an inclined square hollow tube 19 (see FIG. 3) having its lower end connected to a square hollow tube 20 of the frame 14. The hollow tube 20 is secured to one end of a square hollow tube 21, which has the hollow tubes 16 connected thereto intermediate its ends, of the frame 14 and extends forwardly therefrom.

The hollow tube 19 has its bottom secured to a plate 22, which is disposed on top of the hollow tube 20. A plate 23 is positioned on the bottom of the hollow tube 20, and bolts 24 and nuts 25 attach the hollow tube 19 to the hollow tube 20 of the frame 14.

Figure 3:
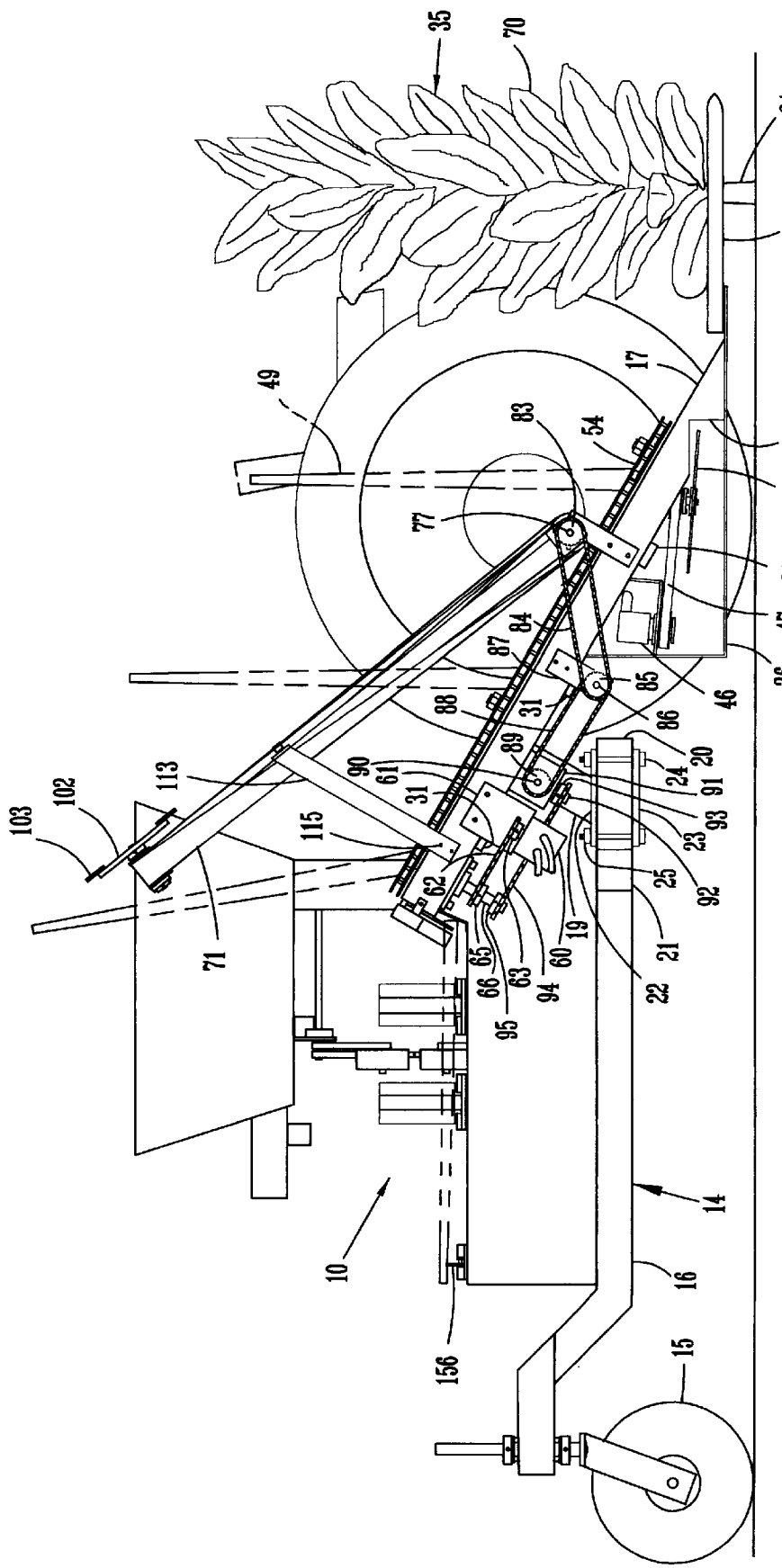
FIG. 3 is a side elevation view of a portion of the tobacco harvester of FIG. 1 showing a tobacco plant just prior to it being cut in a solid line position and the cut tobacco plant in phantom line positions as it is advanced.

Three bars 31 attach the bottom of the hollow tube 18 (see FIG. 6) to the bottom of the hollow tube 17 to support the hollow tube 17 in substantially parallel relation to the hollow tube 18 and with the same inclination as shown in FIG. 3.

Two stalk guide bars 32 and 33 (see FIG. 1) extend forwardly to receive a stalk 34 (see FIG. 3) of a tobacco plant 35 as the tobacco harvester 10 is pulled along a row of the tobacco plants 35 by the tractor 11 (see FIG. 1). The stalk guide bar 32 (see FIG. 3) is supported on a horizontal end of an L-shaped metallic sled runner 36 attached to the hollow tube 17. The stalk guide bar 33 (see FIG. 1) is similarly secured to the hollow tube 18 (see FIG. 6) by a sled runner (not shown) having the same configuration as the sled runner 36 (see FIG. 3).

Each of the tobacco plants 35 has the stalk 34 cut adjacent its butt end 39 (see FIG. 6) by a rotating cutter 45

(see FIG. 3). The cutter 45 is continuously rotated by a hydraulic motor 46 through a belt 47.

Figure 6:
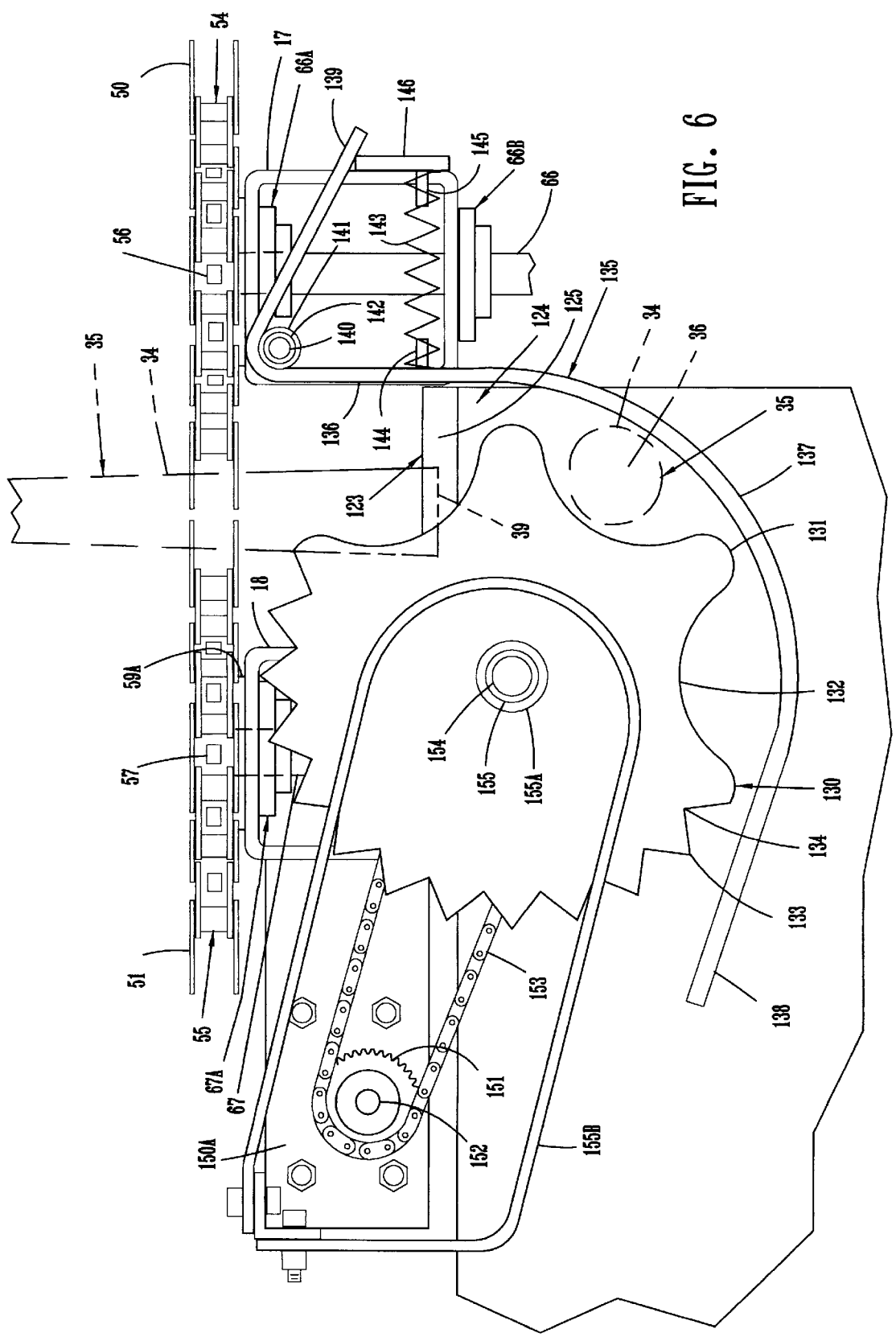
FIG. 6 is an enlarged rear elevation view of a portion of the tobacco harvester of FIG. 5.

The hydraulic motor 46 is supported by the hollow tube 18 (see FIG. 6). Each of the hollow tubes 17 and 18 has a notch (One shown at 48 in the hollow tube 17 in FIG. 3.) formed therein to enable the cutter 45 to rotate. The cutter 45 is supported by the hollow tube 18 (see FIG. 6).

After the rotating cutter 45 (see FIG. 3) cuts or severs the stalk 34 of the tobacco plant 35, the stalk 34 is held or retained in a substantially vertical orientation, as shown in phantom at 49, by two sets of toothed elements 50 (see FIG. 2) and 51. There is a slight spacing between the elements 50 and 51 so that the elements 50 and 51 have their teeth 52 and 53, respectively, penetrate into the stalk 34.

All of the elements 50 are mounted on a chain 54 (see FIG. 6). All of the elements 51 are mounted on a chain 55.

The chain 54 passes around an upper sprocket 56 and a lower sprocket (not shown). The chain 55 passes around an upper sprocket 57 and a lower sprocket (not shown).

Each of the upper sprocket 56 and the lower sprocket (not shown), which is driven by the chain 54, is supported by the inclined hollow tube 17. Each of the upper sprocket 57 and the lower sprocket (not shown), which is driven by the chain 55, is supported by the inclined hollow tube 18.

Figure 4:
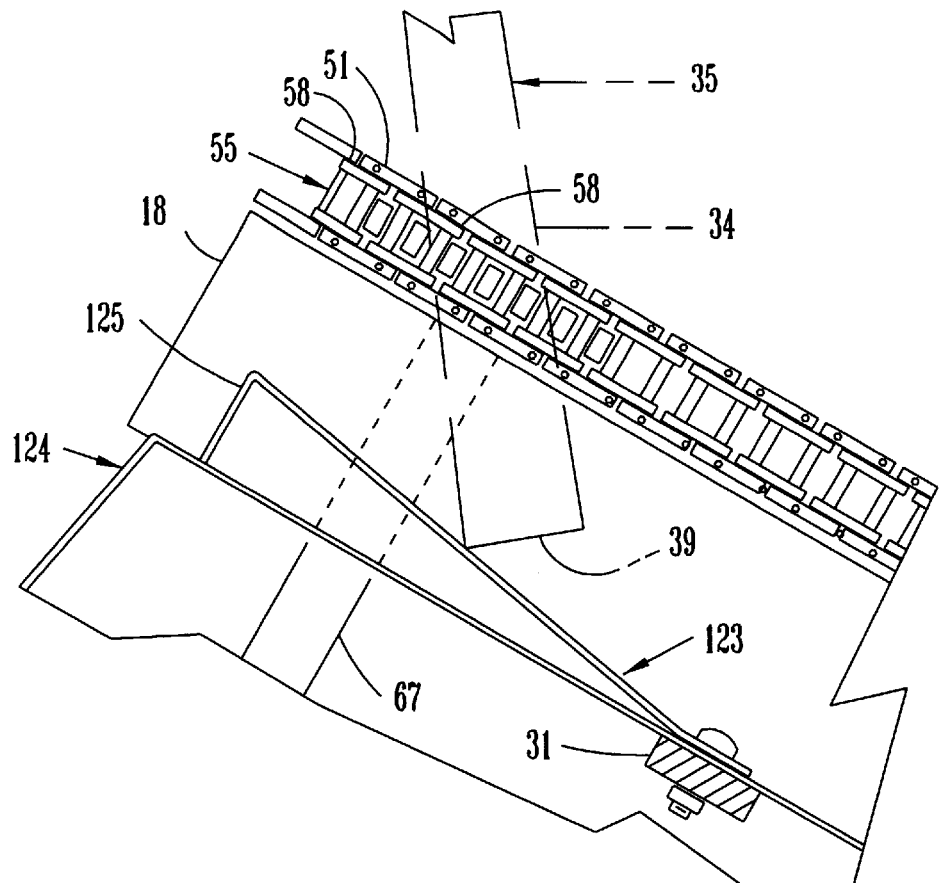
FIG. 4 is an enlarged fragmentary side elevation view of a portion of the tobacco harvester of FIG. 3 and showing a ramp for tilting the stalk of each cut tobacco plant as it is advanced from a cutting position to the elevated position.
Figure 11:
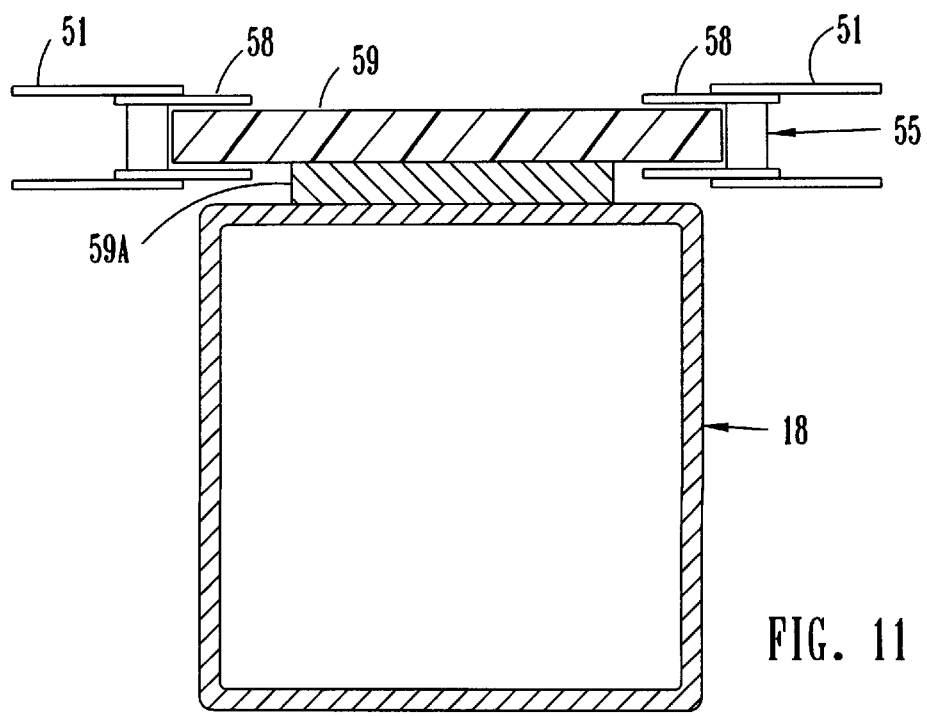
FIG. 11 is a fragmentary elevation view of a portion of one of a pair of chains for toothed elements holding a cut tobacco plant after it has been cut.

As shown in FIG. 4, the element 51 has a portion connected to each of two adjacent links 58 of the chain 55. A chain guide 59 (see FIG. 11), which is formed of an ultra high molecular weight plastic, is disposed between opposite paths of the links 58 at at least one position. A steel spacer 59A is disposed between the guide 59 and the hollow tube 18 to support the chain 55 intermediate the upper sprocket 57 (see FIG. 6) and the lower sprocket (not shown). The guide 59 (see FIG. 11), the spacer 59A, and the hollow tube 18 are fixed to each other by bolts (not shown) and nuts (not shown). The chain 54 (see FIG. 3) is similarly supported.

The chain 54 (see FIG. 3) is driven continuously by a hydraulic motor 60. The hydraulic motor 60 is supported by the hollow tube 17 through a bracket 61.

A chain 62 passes around a sprocket 63 on a shaft (not shown) of the hydraulic motor 60. The chain 62 also passes around a sprocket 65 on a shaft 66, which is rotatably supported in bearings 66A (see FIG. 6) and 66B mounted on the horizontal tube 17. The shaft 66 is attached to the upper sprocket 56 to 20 drive the chain 54.

A hydraulic motor (not shown) drives the chain 55 through a shaft 67, which is rotatably supported in bearings (One shown at 67A in FIG. 6.) mounted on the hollow tube 18, in the same manner as the hydraulic motor 60 (see FIG. 3) drives the chain 54 through the shaft 66. The hydraulic motor (not shown), which drives the chain 55 (see FIG. 6), is in hydraulic series with the hydraulic motor 60 (see FIG. 3) and is supported on the hollow tube 18 (see FIG. 6) in the same manner as the hydraulic motor 60 (see FIG. 3) is supported on the hollow tube 17.

Figure 2:
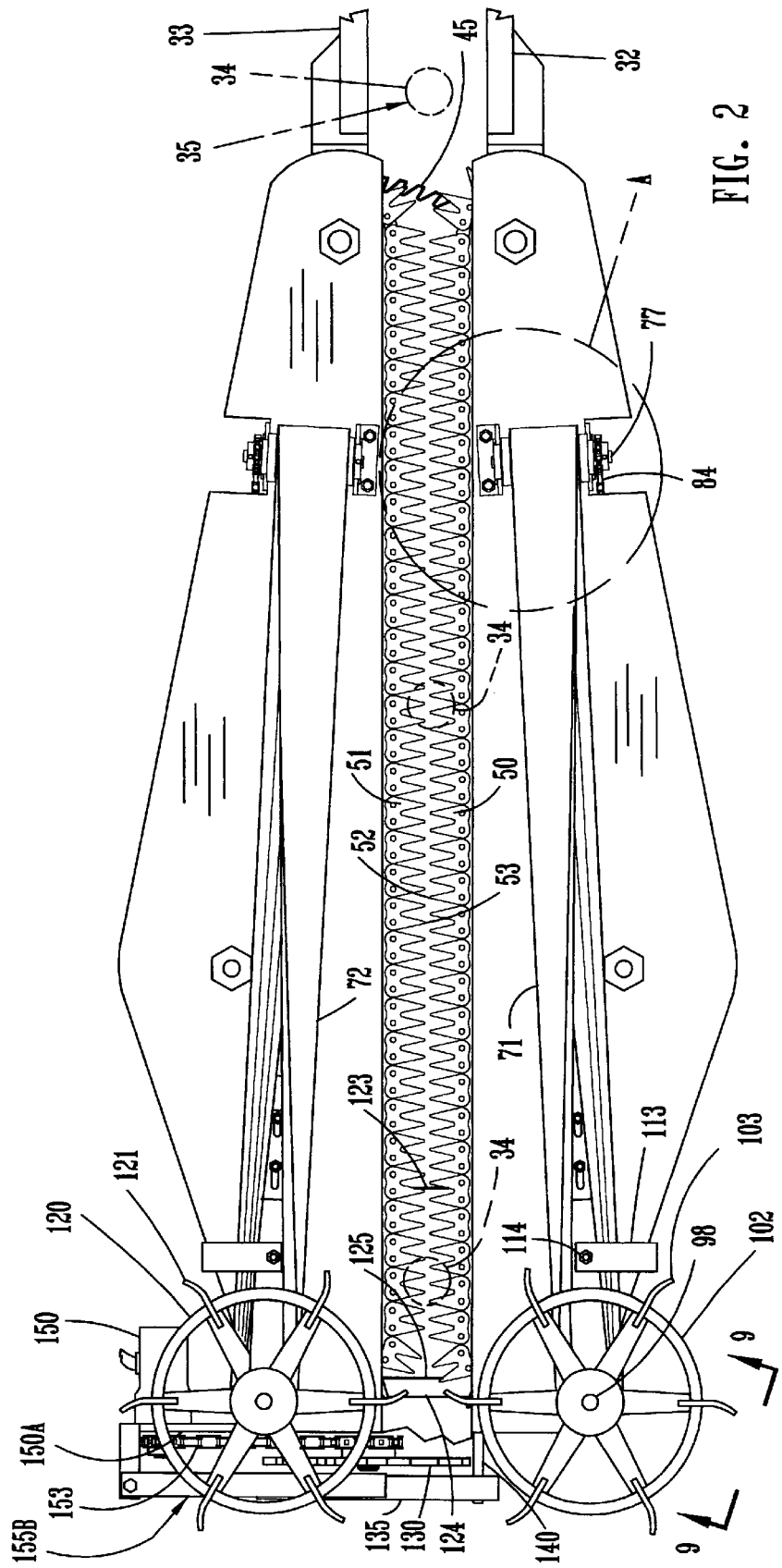
FIG. 2 is an enlarged top plan view of a portion of the tobacco harvester of FIG. 1 and showing cut tobacco plants in phantom positions for advancement from a cutting position to an elevated position along an inclined path.
Figure 5:
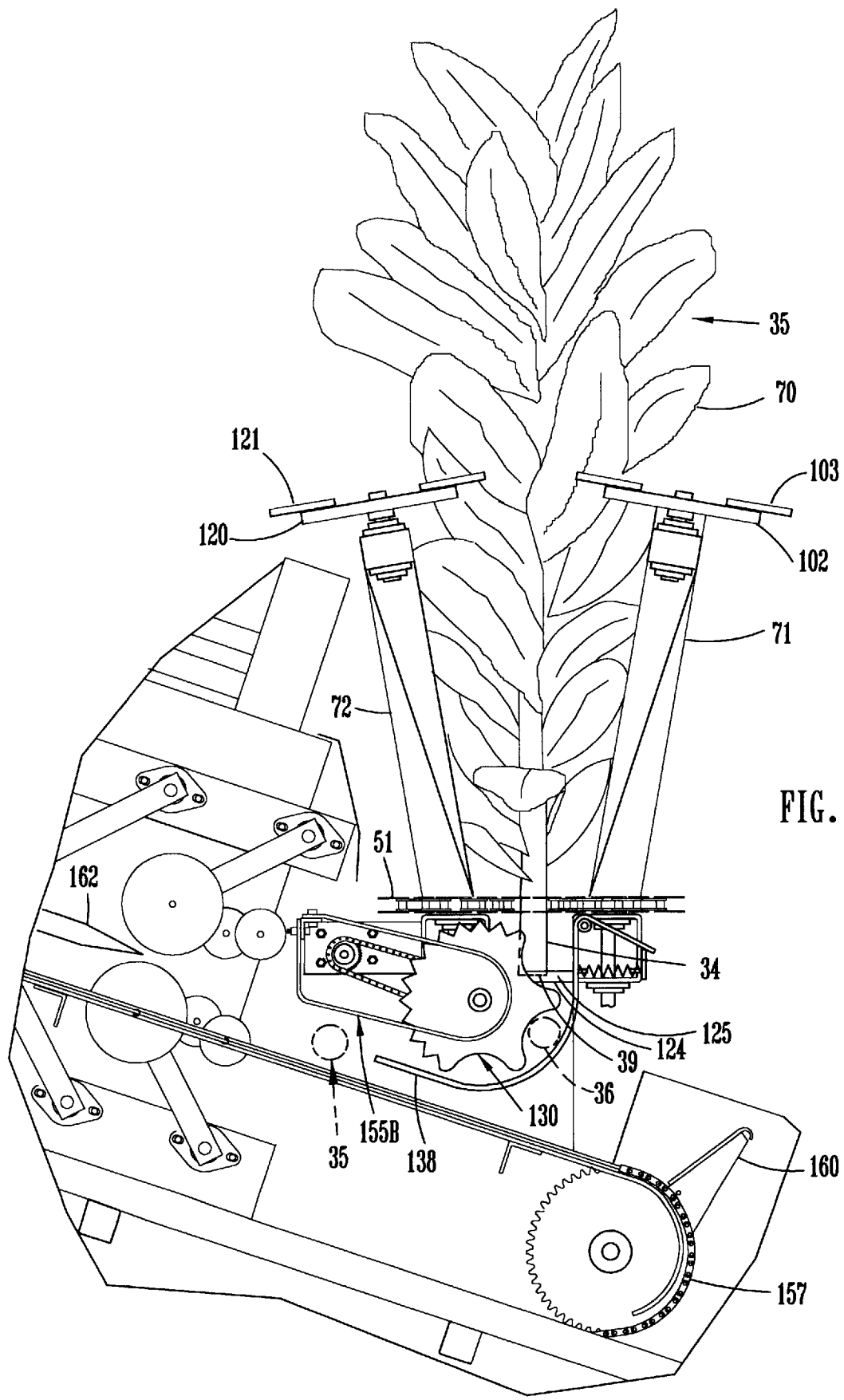
FIG. 5 is a rear elevation view of the tobacco harvester of FIG. 3.

As the toothed elements 50 (see FIG. 2) and 51 carry the plants 35 upwardly, leaves 70 (see FIG. 5) of the cut tobacco plant 35 are engaged by two driven, twisted belts 71 and 72. As shown in FIG. 2, the twisted belt 71 is adjacent the toothed elements 50, and the twisted belt 72 is adjacent the toothed elements 51. The twisted belts 71 and 72 aid in maintaining the cut tobacco plant 35 (see FIG. 3) in its substantially vertical orientation and gently guide the leaves 70 and the stalk 34.

One suitable example of each of the twisted belts 71 (see FIG. 2) and 72 is a V-belt sold under the trademark BROWNING as part no. 4GBB136. This V-belt has four ribs.

Figure 9:
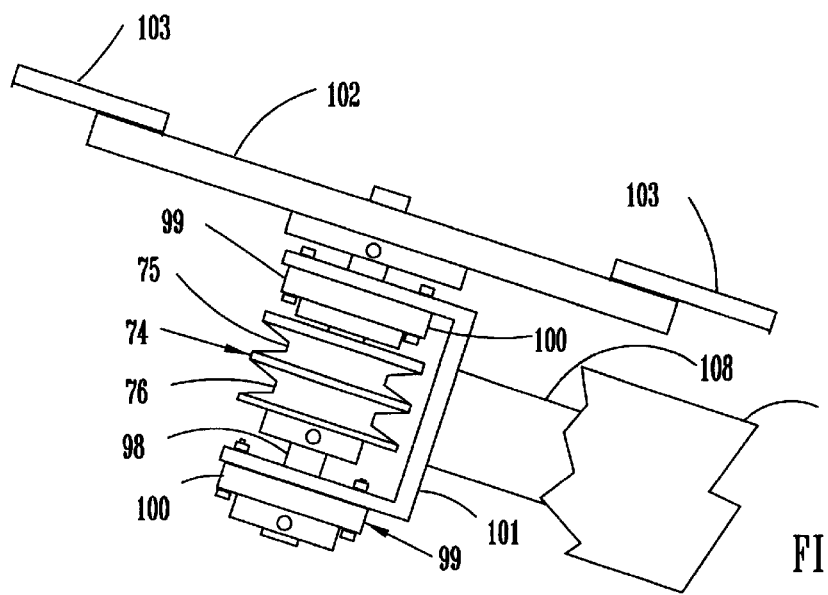
FIG. 9 is an enlarged fragmentary side elevation view of a portion of the tobacco harvester of FIG. 3, taken along line 9—9 of FIG. 2 and showing a support for one end of one of the twisted belts and a rotating wheel utilized for advancing each cut tobacco plant by engaging its leaves after its stalk has been advanced to the elevated position.
Figure 10:
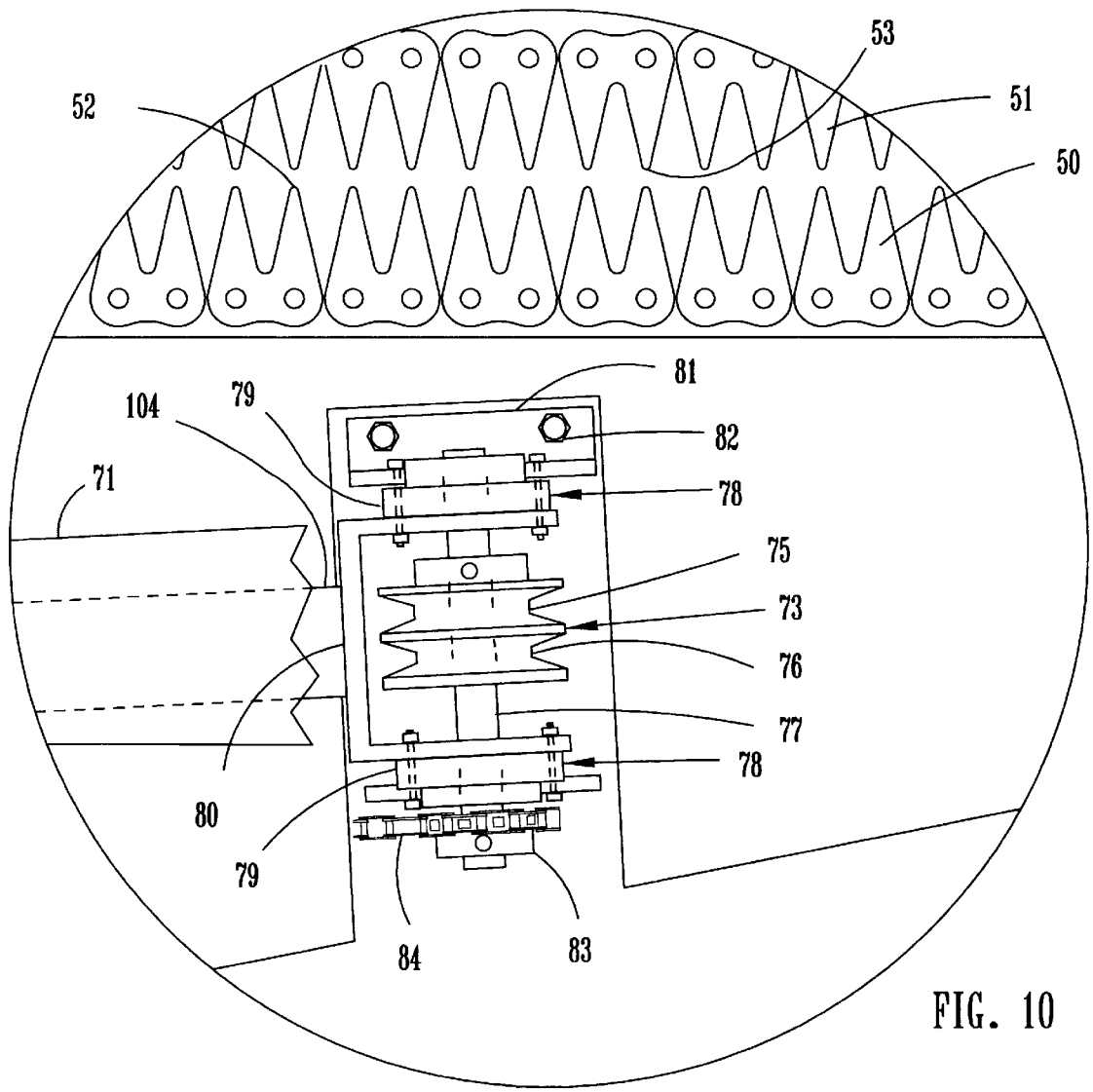
FIG. 10 is an enlarged fragmentary top plan elevation view of a support for the other end of one of the twisted belts and taken within phantom circle A of FIG. 2.

The lower end of the belt 71 passes around a sheave 73 (see FIG. 10) and its upper end passes around a sheave 74 (see FIG. 9), which is the same as the sheave 73 (see FIG. 10). Each of the sheaves 73 and 74 (see FIG. 9) has two grooves 75 and 76 therein to receive the inner two ribs on the belt 71. One suitable example of the sheaves 73 (see FIG. 10) and 74 (see FIG. 9) is sold under the trademark BROWNING as part no. 2BK25.

As shown in FIG. 10, the sheave 73 is fixed to a shaft 77. The shaft 77 has its ends rotatably supported in two spaced bearings 78.

Each of the bearings 78 has a base 79 supported by a yoke 80 to which the base 79 is connected. Each of the bearings 78 also has a housing, which has the base 79 connected thereto and an outer race therein, and an inner race, which is connected to the shaft 77.

One of the bearings 78 also is attached to an L-shaped bracket 81. The bracket 81 is connected by bolts 82 to the inclined hollow tube 17 (see FIG. 6).

The shaft 77 (see FIG. 3) has a sprocket 83 thereon at its outer end. A chain 84 passes around the sprocket 83 and also around a sprocket 85 on a shaft 86, which is supported by a bracket 87 extending downwardly from the hollow tube 17.

The shaft 86 has a second sprocket (not shown), which is concentric with the sprocket 85, mounted thereon. A chain 88 passes around the second sprocket (not shown) on the shaft 86 and a sprocket 89 on a shaft 90 of a gear box 91, which is supported by the hollow tube 17.

The gear box 91 has a second shaft 92 to which is fixed a sprocket 93. A chain 94 passes around the sprocket 93 and a sprocket 95 on the shaft 66.

The shaft 86 also is rotatably supported by a bracket (not shown), which is the same as the bracket 87, supported by the hollow tube 18 (see FIG. 6). The shaft 86 (see FIG. 3) has a sprocket (not shown) transferring the rotation of the shaft 86 through a chain (not shown) to a sprocket (not shown) to drive the flexible belt 72 (see FIG. 2) in the same manner as the flexible belt 71 is driven.

As shown in FIG. 9, the sheave 74 is mounted on a shaft 98 to receive the upper end of the belt 71. The shaft 98 is disposed in two spaced bearings 99.

Each of the bearings 99 has a base 100 supported by a yoke 101 to which the base 100 is connected. Each of the bearings 99 also has a housing, which has the base 100 connected thereto and an outer race therein, and an inner race, which is connected to the shaft 98. The shaft 98 is attached to a wheel 102, which has fingers 103 equiangularly spaced on its circumference as shown in FIG. 2.

Figure 7:
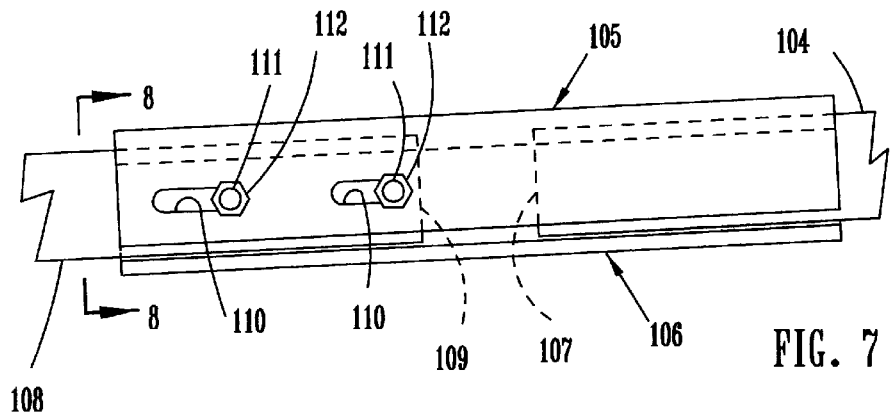
FIG. 7 is an enlarged fragmentary top plan view of an arrangement including telescoping square hollow tubes for tightening a twisted belt of the tobacco harvester of FIG. 3.

The yoke 80 (see FIG. 10) is fixed to a square hollow tube 104. The hollow tube 104 has an angle iron 105 (see FIG. 8) fixed to two adjacent sides thereof. An angle iron 106 is fixed to the other two sides of the square hollow tube 104. As shown in FIG. 7, each of the angle irons 105 and 106 extends beyond end 107 of the hollow tube 104.

A square hollow tube 108 has one end fixed to the yoke 101 (see FIG. 9). The hollow tube 108 has it other end 109 (see FIG. 7) disposed within the angle irons 105 and 106.

Figure 8:
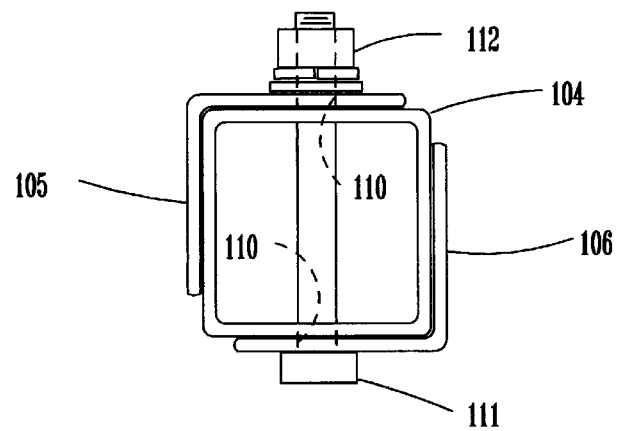
FIG. 8 is an end elevation view, taken along line 8—8 of FIG. 7, and showing one of the square hollow tubes for adjusting the tightness of the twisted belts.

A portion of the angle iron 105 has two longitudinal slots 110 therein as does a substantially parallel portion of the angle iron 106 as shown in FIG. 8. Each of the longitudinal slots 110 receives a bolt 111 extending through holes (not shown) in the top and bottom of the hollow tube 108 with a nut 112 cooperating with each of the bolts 111.

This arrangement enables the positions of the end 107 (see FIG. 7) of the hollow tube 104 and the end 109 of the hollow tube 108 to be shifted relative to each other. This adjusts the tightness of the belt 71 (see FIG. 9). This is accomplished by shifting the distance between the hollow tube 104 (see FIG. 7) and the hollow tube 108. The twisting of the belt 71 (see FIG. 9) is accomplished by the shafts 98 (see FIG. 2) and 77 being in planes substantially perpendicular to each other.

The hollow tube 108 (see FIG. 9) has one end of a bracket 113 (see FIG. 2) attached thereto by a bolt 114. The bracket 113 has its other end attached to the inclined hollow tube 17 (see FIG. 3) by bolts 115.

A similar driving arrangement is provided for a wheel 120 (see FIG. 2), which also has fingers 121 equiangularly spaced on its circumference. The wheels 102 and 120 accelerate each of the cut tobacco plants 35 (see FIG. 5) as it exits from the toothed elements 50 (see FIG. 2) and 51.

Prior to the stalk 34 of the tobacco plant 35 exiting from the toothed elements 50 and 51, the stalk 34 had its butt end 39 (see FIG. 5) engage a ramp 123 (see FIG. 4). The ramp 123 is supported by a trough 124 disposed between the inclined hollow tubes 17 (see FIG. 6) and 18 and supported by the bars 31 (see FIG. 4).

When the butt end 39 of the stalk 34 of the tobacco plant 35 engages the ramp 123, this retards the motion of the butt end 39 of the stalk 34 of the tobacco plant 35 so that the stalk 34 begins to tilt to the left as shown in FIG. 3 as its upper end is moving faster. This continues until the butt end 39 (see FIG. 4) of the stalk 34 of the tobacco plant 35 ceases to engage the ramp 123 through passing beyond its end 125.

As shown in FIG. 2, the end 125 of the ramp 123 is just prior to where the toothed elements 50 and 51 move away from each other. The leaves 70 (see FIG. 5) of the cut tobacco plant 35 have already been moved forwardly of the butt end 39 (see FIG. 6) of the stalk 34 of the tobacco plant 35 when it leaves the end 125 of the ramp 123. As a result, the tobacco plant 35 falls downwardly due to gravity and the weight of the leaves 70 (see FIG. 5) on the falling free end of the tobacco plant 35.

As the tobacco plant 35 falls downwardly, it pivots so that the stalk 34 goes to its substantially horizontal orientation. This is produced by the stalk 34 engaging a continuously rotating disc 130 (see FIG. 6).

One half of the circumference of the disc 130 is formed with relatively large scallops 131 so that a relatively large area 132 is provided between the adjacent of the scallops 131 for the stalk 34 of the tobacco plant 35. The other half of the circumference of the disc 130 is formed with relatively narrow pointed ends 133. These provide relatively small areas 134 therebetween.

A guide 135 cooperates with the circumference of the rotating disc 130 to guide the stalk 34 of the tobacco plant 35 as it is advanced by clockwise rotation of the disc 130. The guide 135 includes a straight upper portion 136, a curved portion 137, a straight lower portion 138. The upper end of the straight upper portion 136 has a straight portion 139 extending therefrom at an angle.

The guide 135 is pivotally supported on a pivot pin 140, which is fixed to the hollow tube 17. At the junction of the portions 136 and 139 of the guide 135, a steel collar 141 is welded to the straight upper portion 136 and the straight portion 139. The steel collar 141 has a bronze bushing 142 therein for receiving the pivot pin 140.

A spring 143 continuously urges the guide 135 towards the rotating disc 130. The spring 143 has one end fitting over a pin 144 on the straight upper portion 136 of the guide 135 and its other end fitting over a pin 145 on a plate 146, which is fixed to the hollow tube 17.

Accordingly, the spring 143 allows the stalk 34 of the tobacco plant 35 to be accommodated in either one of the areas 132 or one of the areas 134 of the disc 130 depending upon where the stalk 34 of the tobacco plant 35 fell after leaving the end 125 of the ramp 123. The maximum amount of pivoting of the guide 135 by the spring 143 towards the rotating disc 130 is limited by the straight portion 139 engaging the plate 146.

The disc 130 is rotated by a hydraulic motor 150 (see FIG. 2), which is support by a plate 150A fixed to the hollow tube 18 (see FIG. 6) having a sprocket 151 on its shaft 152. The sprocket 151 drives a chain 153, which rotates a sprocket (not shown) fixed to the disc 130. A pin 154, which is fixed to the hollow tube 18, has a bronze bushing 155 on which a hub 155A of the sprocket (not shown), which is fixed to the disc 130, rotates.

A guide 155B, which is supported by the plate 150A, cooperates with the straight lower portion 138 of the guide 135 to provide a controlled path of movement as the stalk 34 leaves the area 132 or 134 of the disc 130. This insures that the stalk 34 does not wrap around the disc 130 during its advancement by the disc 130.

The guide 155B also prevents the leaves 70 (see FIG. 5) of the tobacco plant 35 from engaging the disc 130. As shown in FIG. 2, the guide 155B is disposed outwardly of the disc 130.

As the stalk 34 of the tobacco plant 35 assumes its substantially horizontal orientation as shown in phantom in FIG. 3, the leaves 70 on the upper portion of the tobacco plant 35 fall onto a chain 156 (see FIG. 1). The leaves 70 (see FIG. 3) on the lower portion of the tobacco plant 35 fall onto two continuous chains 157 (see FIG. 1) and 158.

The chains 157 and 158 are activated whenever a switch activator 159 is engaged by the falling tobacco plant 35 (see FIG. 6). Each of the chains 157 (see FIG. 1) and 158 has four spaced flights or cleats 160 as more particularly shown and described in the aforesaid Duncan et al patent.

The chain 156 also is activated when the chains 157 and 158 are driven. The chain 156 has much smaller cleats (not shown) on it. This helps convey the upper part of the leaves 70 (see FIG. 3) of the tobacco plant 35.

The remainder of the operation of the tobacco harvester 10 is the same as described in the aforesaid Duncan et al patent. That is, a spear 162 (see FIG. 5) pierces the stalk 34 of the tobacco plant 35 at a distance from the butt end 39 and causes the tobacco plant 35 to pass onto a stick 163 (see FIG. 1) as shown and described in the aforesaid Duncan et al patent. A platform 164 enables a single worker to handle the sticks 163 and remove each of the sticks 163 with the cut tobacco plants 35 (see FIG. 5) thereon.

It should be understood that the stalks 34 of the cut tobacco plants 35 are not necessarily straight due to various weather factors during growth. Therefore, only the bottom portion of the cut tobacco plant 35 may have a substantially vertical orientation.

It should be understood that the wheels 102 and 120 are preferably covered with a relatively soft material such as foam, for example. This protects the leaves 70 during their engagement by the wheels 102 and 120.

An advantage of this invention is that it reduces the cost of harvesting tobacco plants. Another advantage of this invention is that only a single worker is required to handle the tobacco of the tobacco harvester since there is automatic cutting of the tobacco plant and transporting it to a position in which it can be automatically positioned on a tobacco stick. A further advantage of this invention is that it is a faster operation.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A tobacco plant transport apparatus for transporting cut tobacco plants from a substantially vertical orientation at a first position to a substantially horizontal orientation at a second position including:

transport means for transporting each of the cut tobacco plants with its stalk in a substantially vertical orientation from the first position to an elevated position intermediate the first and second positions;

orientation conversion means for converting the stalk of each of the cut tobacco plants from its substantially vertical orientation to a substantially horizontal orientation, said orientation conversion means cooperating with each of the cut tobacco plants being transported by said transport means from prior to said transport means ceasing to transport the cut tobacco plant until the stalk of each of the cut tobacco plants is in its substantially horizontal orientation;

and said orientation conversion means including causing means for causing movement of each of the cut tobacco plants from a position in which its stalk has a substantially vertical orientation.

2. The tobacco plant transport apparatus according to claim 1 in which said causing means of said orientation conversion means causes movement of the stalk of each of the cut tobacco plants from a substantially vertical orientation to a substantially horizontal orientation in a substantially vertical plane in which the stalk of each of the cut tobacco plants is transported by said transport means.

3. A tobacco plant transport apparatus for transporting cut tobacco plants from a substantially vertical orientation at a first position to a substantially horizontal orientation at a second position including:

transport means for transporting each of the cut tobacco plants with its stalk in a substantially vertical orientation from the first position to an elevated position intermediate the first and second positions;

said transport means including holding means for holding the stalk of each of the cut tobacco plants to maintain the stalk of each of the cut tobacco plants in a substantially vertical orientation during its transport by said transport means, said holding means moving along an inclined path from the first position to the elevated position and ceasing to hold the stalk of each of the cut tobacco plants at the elevated position;

orientation conversion means for converting the stalk of each of the cut tobacco plants from its substantially vertical orientation to a substantially horizontal orientation, said orientation conversion means cooperating with each of the cut tobacco plants being transported by said transport means from prior to said transport means ceasing to transport the cut tobacco plant until the stalk of each of the cut tobacco plants is in its substantially horizontal orientation;

said orientation conversion means including causing means for causing movement of each of the cut tobacco plants from a position in which its stalk has a substantially vertical orientation;

and said causing means of said orientation conversion means including stalk engaging means for engaging the stalk of each of the cut tobacco plants prior to said holding means ceasing to hold the stalk of each of the cut tobacco plants, said stalk engaging means causing tilting of the stalk from its substantially vertical orientation toward its substantially horizontal orientation.

4. The tobacco plant transport apparatus according to claim 3 in which said stalk engaging means includes retarding means for retarding the advancement of the stalk of each of the cut tobacco plants as its butt end during advancement of the remainder of the stalk of each of the cut tobacco at its butt end plants to tilt the stalk from its substantially vertical orientation toward its substantially horizontal orientation.

5. The tobacco plant transport apparatus according to claim 4 in which said retarding means includes a ramp for engaging the butt end of the stalk of each of the cut tobacco plants prior to said holding means ceasing to hold the stalk of each of the cut tobacco plants.

6. The tobacco plant transport apparatus according to claim 5 including a belt disposed on each side of the path of each of the cut tobacco plants for engaging the leaves on the stalk of each of the cut tobacco plants having its stalk held by said holding means, each of said belts extending upwardly from a position adjacent said holding means at an acute angle to the inclined path of said holding means.

7. The tobacco plant transport apparatus according to claim 6 including leaf engaging means disposed adjacent the upper end of each of said belts for engaging the leaves on the stalk of each of the cut tobacco plants to advance the stalk at least after the stalk ceases to be held by said holding means.

8. The tobacco plant transport apparatus according to claim 7 in which said orientation conversion means includes receiving means for receiving the stalk of each of the cut tobacco plants adjacent its butt end after the cut tobacco plant has been advanced by said leaf engaging means and is falling by gravity toward its substantially horizontal orientation.

9. The tobacco plant transport apparatus according to claim 8 in which said receiving means includes advancing means for advancing the cut tobacco plant in its substantially horizontal orientation toward the second position.

10. The tobacco plant transport apparatus according to claim 9 in which each of said leaf engaging means includes a rotating wheel rotatable about a substantially vertical axis.

11. The tobacco plant transport apparatus according to claim 10 in which each of said rotating wheels has fingers spaced around its circumference and extending therefrom for engaging the leaves on the stalk of each of the cut tobacco plants.

12. The tobacco plant transport apparatus according to claim 11 in which said advancing means includes a continuously driven disc having its circumference formed with a first portion having relatively narrow pointed teeth and a second portion having relatively large scallops with the stalk of each of the cut tobacco plants being received in one of the first and second portions adjacent its butt end.

13. The tobacco plant transport apparatus according to claim 12 in which each of said belts is twisted between its ends.

14. The tobacco plant transport apparatus according to claim 9 in which said advancing means includes a continuously driven disc having its circumference formed with a first portion having relatively narrow pointed teeth and a second portion having relatively large scallops with the stalk of each of the cut tobacco plants being received in one of the first and second portions adjacent its butt end.

15. The tobacco plant transport apparatus according to claim 7 in which each of said leaf engaging means includes a rotating wheel rotatable about a substantially vertical axis.

16. The tobacco plant transport apparatus according to claim 15 in which each of said rotating wheels has fingers spaced around its circumference and extending therefrom for engaging the leaves on the stalk of each of the cut tobacco plants.

17. The tobacco plant transport apparatus according to claim 16 including a belt disposed on each side of the path of each of the cut tobacco plants for engaging the leaves on the stalk of each of the cut tobacco plants having its stalk held by said holding means, each of said belts extending upwardly from a position adjacent said holding means and at an acute angle to the path of said holding means.

18. The tobacco plant transport apparatus according to claim 17 in which each of said belts is twisted between its ends.

19. A tobacco plant transport apparatus for transporting tobacco plants from a tobacco plant cutter until each of the cut tobacco plants is positioned so that its stalk can be pierced by a spear for disposition on a stick including:

first transport means for receiving a butt end of a stalk of each tobacco plant as it is cut by the cutter at a cutting position, said first transport means transporting each of the cut tobacco plants with its stalk in a substantially vertical orientation from the cutting position to an elevated position;

orientation conversion means for converting the stalk of each of the cut tobacco plants from its substantially vertical orientation to a substantially horizontal orientation, said orientation conversion means cooperating with each of the cut tobacco plants being transported by said first transport means from prior to said first transport means ceasing to transport the cut tobacco plant until the stalk of each of the cut tobacco plants is in its substantially horizontal orientation;

said orientation conversion means including causing means for causing movement of each of the cut tobacco plants from a position in which its stalk has a substantially vertical orientation;

and second transport means for transporting each of the cut tobacco plants in which its stalk has a substantially horizontal orientation to a position in which a spear can pierce the stalk adjacent its butt end for disposition on a stick.

20. The tobacco plant transport apparatus according to claim 19 in which:

said first transport means includes holding means for holding the stalk of each of the cut tobacco plants to maintain the stalk of each of the cut tobacco plants in a substantially vertical orientation during its transport from the cutting position to the elevated position, said holding means moving along an inclined path from the cutting position to the elevated position and ceasing to hold the stalk of each of the cut tobacco plants at the elevated position;

and said causing means of said orientation conversion means includes stalk engaging means for engaging the stalk of each of the cut tobacco plants prior to said holding means ceasing to hold the stalk of each of the cut tobacco plants, said stalk engaging means causing tilting of the stalk from its substantially vertical orientation toward its substantially horizontal orientation.

21. The tobacco plant transport apparatus according to claim 20 including a belt disposed on each side of the path of each of the cut tobacco plants for engaging the leaves on the stalk of each of the cut tobacco plants having its stalk held by said holding means, each of said belts extending upwardly from a position adjacent said holding means at an acute angle to the path of said holding means.

\* \* \* \* \*

UNITED STATES PATENT AND TRADEMARK OFFICE
CERTIFICATE OF CORRECTION

PATENT NO. : 6,226,968 B1
DATED : May 8, 2001
INVENTOR(S) : George A. Duncan

Page 1 of 1

It is certified that error appears in the above-identified patent and that said Letters Patent is hereby corrected as shown below:

Column 3,
Line 44, cancel "20"

Claim 4,
Line 4, "as" should read -- at --
Line 5, cancel "at its"
Line 6, cancel "butt end"

Claim 17,
Line 2, "16" should read -- 3 --

Signed and Sealed this

Thirteenth Day of November, 2001

Attest:

NICHOLAS P. GODICI
Attesting Officer
*Acting Director of the United States Patent and Trademark Office*